May 2, 1944.　　　　J. KIBURZ ET AL　　　　2,347,830
FLOW INDICATOR
Filed Jan. 10, 1942　　　　2 Sheets-Sheet 1

INVENTOR.
JOHN KIBURZ
JACK Y. KIBURZ
BY
ATTORNEY

May 2, 1944.　　　　　J. KIBURZ ET AL　　　　　2,347,830
FLOW INDICATOR
Filed Jan. 10, 1942　　　　　2 Sheets-Sheet 2
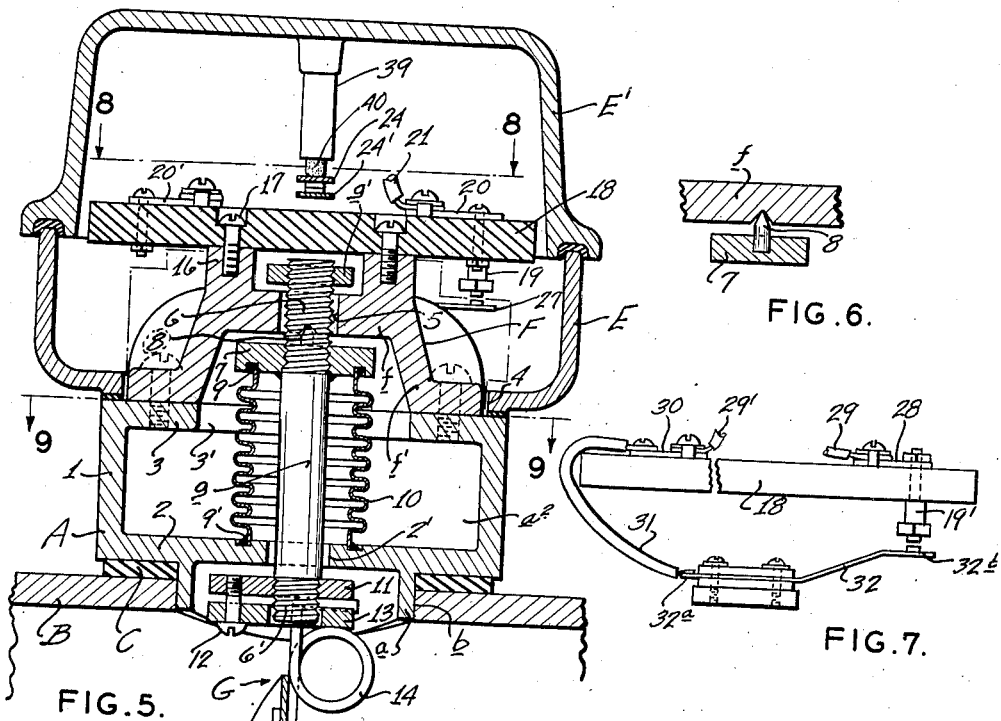
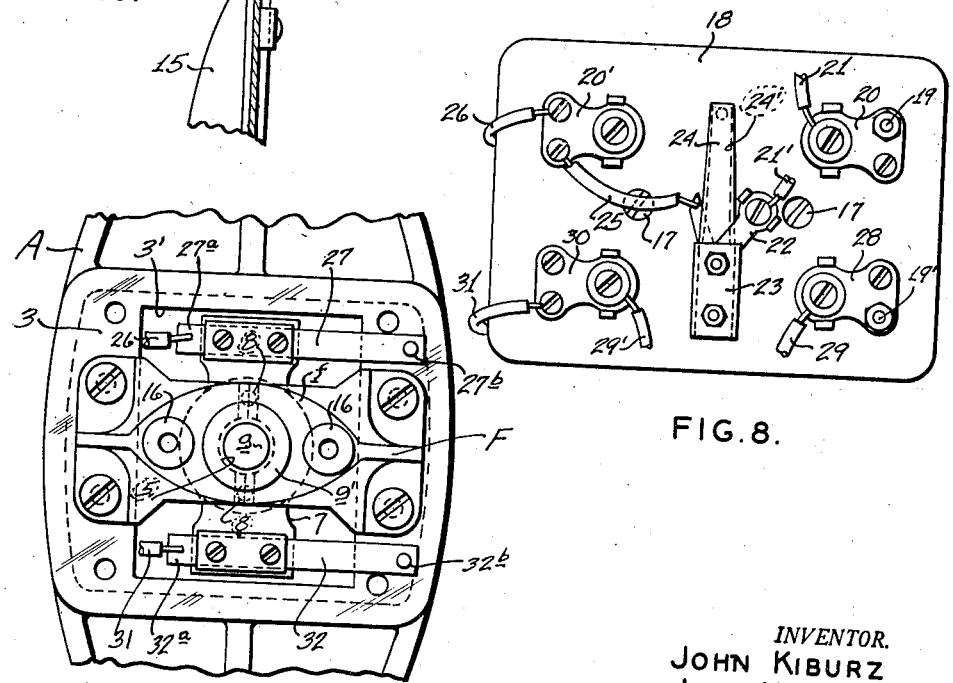
INVENTOR.
JOHN KIBURZ
JACK Y. KIBURZ
BY
ATTORNEY Patented May 2, 1944

2,347,830

UNITED STATES PATENT OFFICE 2,347,830

FLOW INDICATOR

John Kiburz and Jack Y. Kiburz, University City, Mo., assignors to John Kiburz Pattern Company, St. Louis, Mo., a corporation of Missouri Application January 10, 1942, Serial No. 426,326

7 Claims. (Cl. 73—228)

This invention relates generally to fire extinguishing sprinkler and other fluid flow systems and, more particularly, to a certain new and useful improvement in flow indicators especially, though not exclusively, adapted for use in systems of the class mentioned.

Flow of the fluid in such a system may follow either a fire, the presence of a leak, the destruction of a sprinkler-head, or other cause, and a flow from a leak or an open sprinkler-head without the presence of a fire may cause considerable damage. It is hence quite essential for the elimination of unnecessary property damage that notice by way of a signal or an alarm of any such flow may very promptly be communicated to the proper authorities.

Our invention hence has for its chief object the provision of means for positively and quickly signalling or indicating fluid flow in a system of the type stated.

Our invention has for a further object the provision of an indicator of the type and for the purpose stated which may be readily and economically constructed, which may with ease and facility be installed in the system, which is durable and compact, which is low in maintenance and operating costs, and which is efficient in the performance of its intended functions.

And with the above and other objects in view, our invention resides in the novel features of form, construction, arrangement, and combination of parts presently described and pointed out in the claims.

In the accompanying drawings (two sheets)—

Figure 5 is an enlarged longitudinal sectional view of the indicator taken at right-angles to, and approximately on the line 5—5 of, Figure 2;

Figure 1:
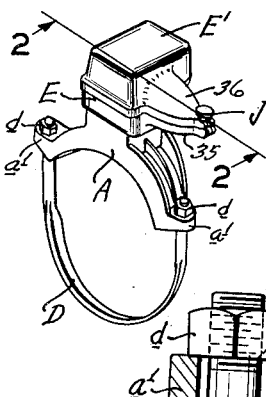
Figure 1 is a reduced elevational view of a fluid flow indicator constructed in accordance with and embodying our invention.
Figure 2:
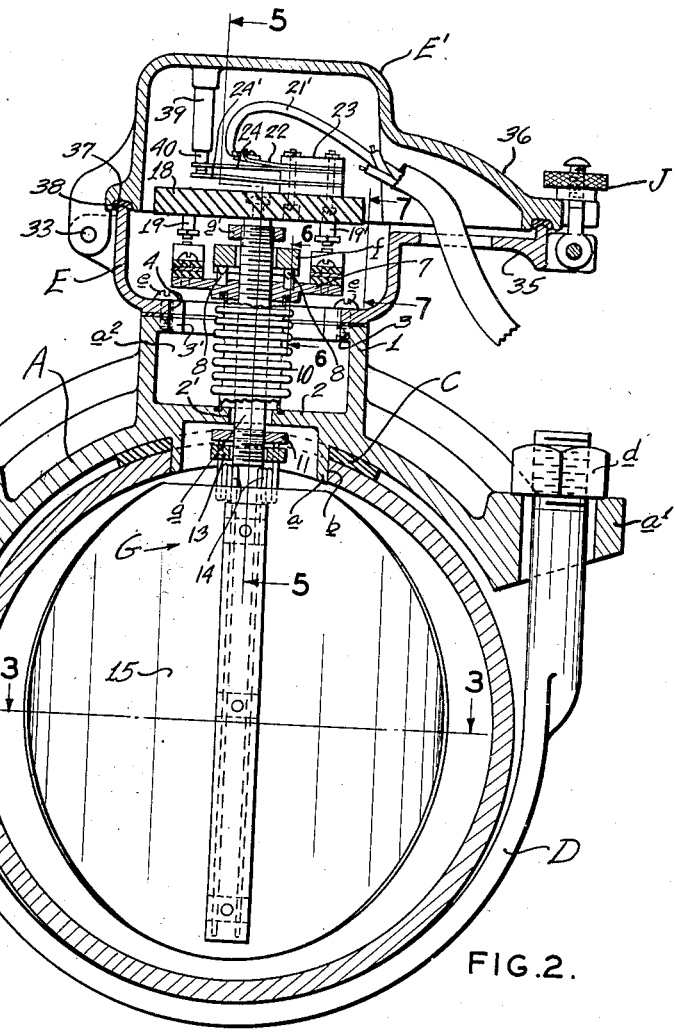
Figure 2 is an enlarged longitudinal sectional view of the indicator taken approximately on the line 2—2, Figure 1.

Figures 6 and 7 are detail longitudinal sectional views of the indicator taken approximately on the lines 6—6 and 7—7, respectively, Figure 2;

Figure 8 is a sectional plan view of the indicator taken approximately on the line 8—8, Figure 5; and Figure 9 is a transverse sectional view taken approximately on the line 9—9, Figure 5.

Referring now in more detail and by reference characters to the drawings, which illustrate a preferred embodiment of our invention, the indicator includes a yoke or saddle A of suitable arcuate conformation relatively to a pipe B of the particular sprinkler or other system, the pipe B having a suitable opening $b$ in its wall for accommodating a depending annular boss $a$ of the saddle or yoke A. A gasket, washer, or the like C is interposed between the yoke A and pipe B, and the saddle A, in practice and installation, is rigidly fixed to and upon the pipe B as by means of a U-shaped clamp, strap, or the like D engaging, and by nuts $d$ fixed to, apertured ears $a^1$ projecting outwardly from the saddle A, as best seen in Figure 2.

Centrally intermediate its ends, the saddle A is of considerable thickness to include a shell-section $a^2$ having an upstanding side wall 1, a base wall 2 having a transverse opening, as at 2', for communicating the chamber of the shell $a^2$ through the boss $a$ with the interior of the pipe B, and a top wall 3 centrally apertured or cut away, as at 3'.

Seated and fixed, as by means of screws or the like $e$ engaging the wall 3, upon the shell-section $a^2$ of the yoke A, is a box-shaped housing-section E open at its top and cut away, as at 4, for accommodating some of the working parts of the indicator, as presently fully appears.

F indicates a bridge-member having a wall $f$ extending transversely over, and by means of depending end-portions $f'$ resting upon and bolted or otherwise secured to the shell-wall 3 spaced from, the aperture 3', the bridge-wall $f$ having a central aperture 5 for freely and loosely, or as it may well be said, floatwise accommodating a short rod or shaft $g$ forming part of what may be described as the vane-assembly G of the indicator, the shaft $g$ being preferably threaded at its opposite ends, as at 6, 6', for purposes presently appearing.

Figure 4:
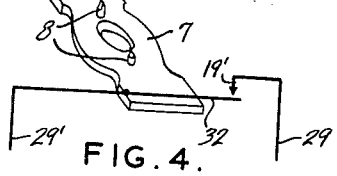
Figure 4 is a diagrammatic view illustrating in plan a switch-plate of the indicator and associated contacts.

The vane-assembly G also includes a disk $g'$, which is preferably fixed on the upper end 6 of the shaft $g$ above the bridge-wall $f$ for securing the vane-assembly G and saddle A permanently together. And fixed on the upper end 6 of the shaft $g$ in suitable spaced relation from and under the bridge-wall $f$, is a plate 7 approximately oblong-rectangular in plan, all as best seen in Figures 2, 4, and 5, upstanding from which upon diametrically opposite sides of the shaft $g$, are knife pivot-studs 8, 8, pivotally engaging at their free upper ends in inverted V-shaped notches in the under face of the bridge-wall *f* for oscillation of the vane-assembly G, as presently fully appears.

Encircling the shaft *g* and having its one end permanently fixed, as at 9, to the under face of the plate 7 and its opposite end fixed, as at 9', to and upon the upper face of the lower shell-wall 2, is a suitable length section of thin circumferentially corrugated tubing commonly known as a flexible bellows 10.

Figure 3:
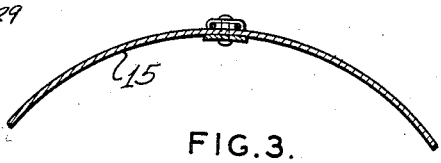
Figure 3 is a transverse sectional view of the indicator taken approximately on the line 3—3, Figure 2.

Threaded upon the lower end 6' of the shaft *g* and disposed within the confines of the boss *a*, is a disk or other suitably shaped plate 11, to which, as by means of screws or the like 12, is fixed a second plate 13 apertured for accommodating the end 6' of the shaft *g* and to which are suitably fixed the respective upper ends of coil-springs 14, the opposite or lower end-portions of which are elongated outwardly or downwardly to support, and upon which is suitably fixed, a thin sheet metal vane 15 preferably of elliptical contour in elevation and of concavo-convex formation in section, as best seen in Figures 2 and 3.

The bridge F is provided upon its wall *f* with upwardly presented suitably tapped bosses 16, to and upon which is flatwise secured, as by means of screws or the like 17, an insulation plate 18, extending transversely through, and depending from the under face of, which are suitably spaced fixed contact-members or posts 19, 19'.

The post 19 is, in turn, by means of a conducting plate or the like 20, electrically connected with a conductor 21 leading to one side of an alarm or signalling circuit, the other side of which is electrically connected, as by means of a conductor 21', with a terminal 22 suitably fixed, as at 23, upon the plate 18 in electrical connection with a spring contact-member 24.

Also suitably fixed, as by the securing means 23, on the plate 18, but insulated and normally spaced from the spring contact-member 24, is a companion contact-member 24' having electrical connection, as by means of a conductor 25 and plate 20' on the plate 18, with a conductor 26 having, in turn, electrical connection with an end-portion 27ᵃ of a yielding conducting strip 27 fixed centrally flatwise to and upon, and insulated from, an end portion of the vane-assembly plate 7, the yielding or spring contact-strip 27 having its opposite end-portion 27ᵇ formed, as shown, for normally spaced relation to the fixed contact post 19 and for electrical connection therewith on flow-caused or induced oscillation of the vane-assembly G.

The post 19' is, in turn, by means of a conducting plate or the like 28, electrically connected with a conductor 29 leading to one side of a second alarm or signalling circuit, the other side of which is electrically connected, as by means of a conductor 29', with a terminal 30 also suitably fixed upon the plate 18, as best seen in Figure 8.

Electrically engaging the terminal or conducting-plate 30, is a conductor 31 having, in turn, electrical connection with an end portion 32ᵃ of a second yielding conducting-strip 32 similar to the strip 27 and, in like manner, fixed centrally flatwise to and upon, and insulated from, the opposite end portion of the vane-assembly plate 7, the spring contact-strip 32 having its opposite end portion 32ᵇ also formed, as shown, for normally spaced relation to the fixed contact post 19' and for electrical connection therewith on flow-caused or induced oscillation of the vane-assembly G.

Suitably hinged, as at 33, to and upon the housing-section E, is a complementary housing-member or lid E', the companion housing-members E, E', being formed with laterally or outwardly presented extensions 35 and 36, respectively, suitably equipped with clamp means J for securing the lid E' in closed position to and upon the housing-member E, as best seen in Figure 2, the housing-lid E' being preferably provided marginally with a recess, as at 37, equipped with packing 38 for co-operation with the wall of member E, as shown, in the formation of a fluid-tight joint between the companion housing-members E, E'.

Fixed to, and depending from the under face of, the top wall of the housing-member or lid E', is a stud 39 provided at its lower end with a cushion-member 40 for yieldingly depressing the contact-member 24, when the cover E' is in closed position, into electrical engagement with the companion contact-member 24' for completing that particular alarm or signalling circuit, such circuit being again broken when the lid E' is shifted to hingedly raised or open position.

In use and practice, the indicator being installed, as described, upon a pipe B of the sprinkler or other system, the flexible vane 15 will be disposed transversely of the pipe-interior for engagement by and with any fluid flow. Accordingly, should any fluid flow develop or arise through or by any cause in the pipe B, the vane 15 will be engaged and yieldingly tilted or oscillated by such flow, whereupon the spring-contact members 32, 27, will engage the fixed contact posts 19, 19', the several alarm or signalling circuits being thereby closed. Such circuits remain closed so long as the vane 15 is held in such swung or tilted position by the fluid flow in the pipe B, the vane 15 reversely oscillating to normal position and thereby opening the alarm circuits when and as fluid flow ceases. One of such alarm or signalling circuits is, of course, automatically opened, even when the contacts 19', 32, are in electrical connection, when and as the lid E' is swung to open position and the stud 39 removed from depressing engagement with the spring-contact member 24.

The indicator fulfills in every respect the objects stated, and it is to be understood that changes and modifications in the form, construction, arrangement, and combination of the several parts of the indicator may be made and substituted for those herein shown and described without departing from the nature and principle of our invention.

Having thus described our invention, what we claim and desire to secure by Letters Patent is:

1. A flow indicator comprising a saddle for pipe-engagement, the saddle having an apertured wall for communication with the pipe-interior, a bridge-member fixed to, and including a wall spanning the aperture in, the saddle, the bridge-wall having an aperture in registration with the aperture of the saddle-wall, and a vane-assembly including a bellows fixed upon and upstanding from the saddle-wall, the bellows at its base surrounding the saddle-wall aperture, a shaft lengthwise loosely extending through said registering apertures, a vane fixed to the shaft for disposition within the pipe-interior, and a rigid plate fixed to the shaft and to the upper end of the bellows for loosely supporting the shaft, the plate having a mechanical pivot connection with the bridge-wall for vane-assembly oscillation responsive to fluid flow in the pipe.

2. A flow indicator comprising a saddle for pipe-engagement, the saddle having an apertured wall for communication with the pipe-interior, a bridge-member fixed to, and including a wall spanning the aperture in, the saddle, said wall having spaced notches on its under face and an aperture in registration with the aperture of the saddle-wall, and a vane-assembly including a bellows fixed upon and upstanding from the saddle-wall, the bellows at its base surrounding the saddle-wall aperture, a shaft lengthwise extending loosely through said registering apertures, a vane fixed to the shaft for disposition within the pipe-interior, a rigid plate fixed to the shaft and to the upper end of the bellows for loosely supporting the shaft, and studs upstanding from the upper face of the plate and at their upper free ends engaging the bridge-wall at said notches for vane-assembly oscillation responsive to fluid flow in the pipe.

3. A flow indicator comprising a saddle for pipe-engagement, the saddle having an apertured wall for communication with the pipe-interior, a bridge-member fixed to, and including a wall spanning the aperture in, the saddle, said wall having spaced notches on its under face and an aperture intermediate said notches and in registration with the saddle-aperture, and a vane-assembly having a floating connection with the bridge-member and including a vane-supporting shaft projecting through the registering apertures in the saddle and bridge-member, a rigid plate mounted on the shaft, studs upstanding from the upper face of the plate and at their upper free ends engaging the bridge-wall at said notches for vane-assembly oscillation responsive to fluid flow in the pipe.

4. A flow indicator comprising a saddle for pipe-engagement, the saddle having an apertured wall for communication with the pipe-interior, a bridge-member fixed to, and including a wall spanning the aperture in, the saddle, said wall having spaced notches on its under face and an aperture intermediate said notches, and a vane-assembly having a floating connection with the bridge-member for oscillation responsive to fluid flow in the pipe, said vane-assembly comprising a shaft extending endwise through said registering bridge-member and saddle apertures, a rigid plate fixed on the shaft, studs upstanding from the plate and at their upper free ends engaging said notches, a flexible bellows encircling the shaft and fixed at one end to said plate and at its opposite end to said saddle-wall, and a flow-engaging member yieldingly fixed to and depending from the shaft for projection into the pipe.

5. A flow indicator comprising a saddle for pipe-engagement, the saddle having an apertured wall for communication with the pipe-interior, a bridge-member fixed to, and including a wall spanning the aperture in, the saddle, said wall having spaced notches on its under face and an aperture intermediate said notches, and a vane-assembly having a floating connection with the bridge-member for oscillation responsive to fluid flow in the pipe, said vane-assembly comprising a shaft extending endwise through said registering bridge-member and saddle apertures, a rigid plate fixed on the shaft, studs upstanding from the plate and at their upper free ends engaging said notches, a flexible bellows encircling the shaft and fixed at one end to said plate and at its opposite end to said saddle-wall, a disk fixed on the lower end of the shaft, a coiled spring engaging with the disk, and a flow-engaging member fixed to, and yieldingly supported by, the spring.

6. A flow indicator comprising a saddle for pipe-engagement, the saddle including a shell-section having spaced upper and lower apertured walls for communication with the pipe-interior, a bridge-member fixed to, and including a wall spanning the aperture in the upper wall of, the saddle, said bridge-wall having spaced notches on its under face and an aperture intermediate said notches, and a vane-assembly having a floating connection with the bridge-member for oscillation responsive to fluid flow in the pipe, said vane-assembly comprising a shaft extending endwise through said registering bridge-member and saddle apertures, a rigid plate fixed on the shaft, studs upstanding from the plate and at their upper free ends engaging said notches, a flexible bellows encircling the shaft and permanently fixed at one end to said plate and at its opposite end to the lower saddle-wall, a spring-member fixed to the lower end of the shaft, and a flow-engaging vane fixed to and depending from the spring-member for projection into said pipe.

7. A flow indicator comprising a saddle of arcuate contour for pipe-engagement, the saddle including a shell-section having spaced upper and lower apertured walls and a depending boss for communication with the pipe-interior, a bridge-member fixed to, and including a wall spanning the aperture in the upper wall of, the saddle, said bridge-wall having spaced notches on its under face and an aperture intermediate said notches, a box-shaped housing for said bridge-member fixed to and upon the saddle, and a vane-assembly having a floating connection with the bridge-member for oscillation responsive to fluid flow in the pipe, said vane-assembly comprising a shaft extending endwise through said registering bridge-member and saddle apertures, a rigid plate fixed on the shaft, studs upstanding from the plate and at their upper free ends engaging said notches, a flexible bellows encircling the shaft and permanently fixed at one end to said plate and at its opposite end to the lower saddle-wall, a spring-member fixed to the lower end of the shaft, and a flow-engaging vane fixed to and depending from the spring-member for projection into said pipe.

JNO. KIBURZ.
JACK Y. KIBURZ.